Nov. 5, 1968  J. O. BENSON  3,408,980
CRUMB COATING MACHINE
Filed Jan. 25, 1967  2 Sheets-Sheet 1

INVENTOR.
JOHN O. BENSON
BY *Kenneth D. Ohm*
ATTORNEY

Nov. 5, 1968   J. O. BENSON   3,408,980
CRUMB COATING MACHINE
Filed Jan. 25, 1967   2 Sheets-Sheet 2

INVENTOR.
JOHN O. BENSON
BY *Kenneth D. Ohm*
ATTORNEY

United States Patent Office 3,408,980
Patented Nov. 5, 1968

3,408,980
CRUMB COATING MACHINE
John O. Benson, Mayer, Minn., assignor to General Mills, Inc., a corporation of Delaware
Filed Jan. 25, 1967, Ser. No. 611,758
10 Claims. (Cl. 118—19)

ABSTRACT OF THE DISCLOSURE

An elongated chamber rotatable about a generally horizontal axis. The chamber is divided into a liquid batter containing section and a crumb containing section. A spout feeds food product to be coated into the liquid batter section. The liquid batter section has perforated lifting plates which, as the chamber rotates, remove the food product from the liquid batter and place it onto another feeding spout. This feeding spout directs the food product into the crumb coating section. In the crumb coating section the food product is tumbled in the crumbs as the chamber rotates about its generally horizontal axis.

---

The present invention relates to an apparatus for treating food products. More particularly, it pertains to an apparatus for coating food products with crumbs, such as bread crumbs.

One of the greatest problems encountered by the present inventor in the coating of food products with crumbs, such as bread crumbs, has been to provide a coating of proper uniformity so that further heating of the coated product can be easily and properly carried out.

Accordingly, one object of the present invention is to provide an apparatus that will enable the uniform coating of a food product with crumbs, such as bread crumbs, so that further heating of such product can be easily and properly carried out.

Other objects and advantages of the invention will be apparent from the following description in which certain preferred embodiments of the invention are disclosed. In the drawings which form a part of this application.

Figure 1:
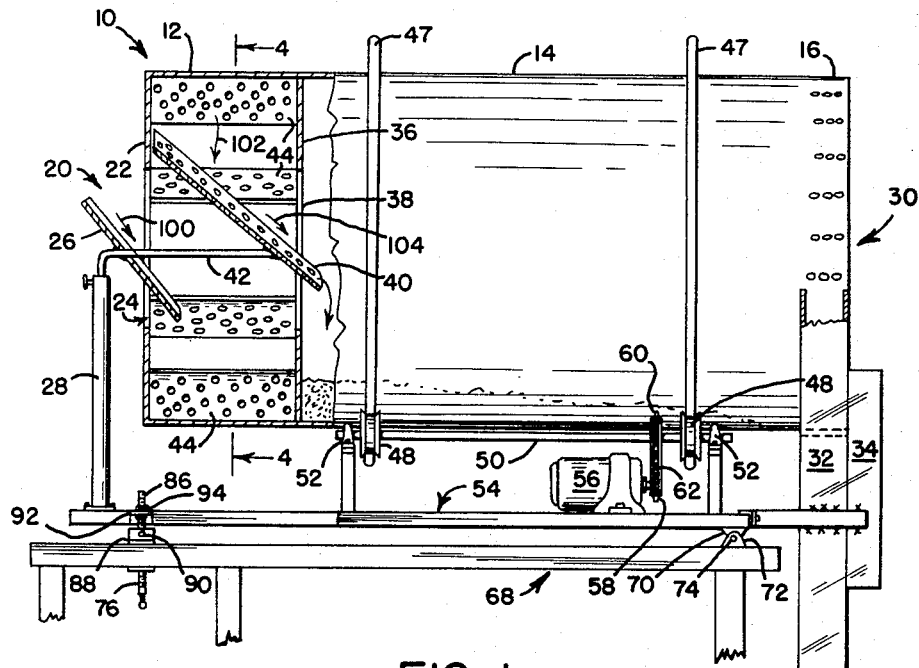
Figure 2:
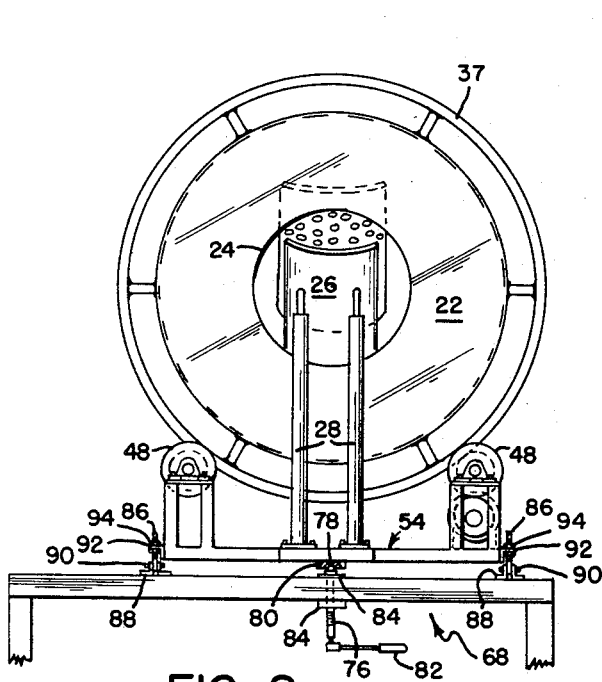
Figure 4:
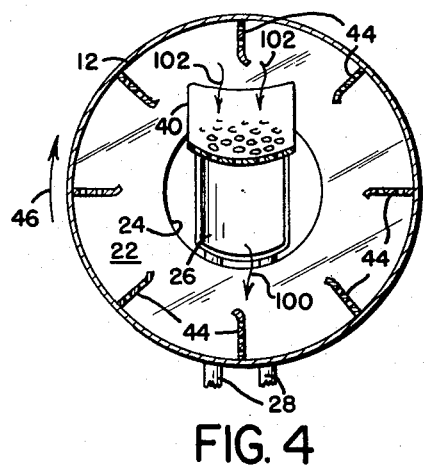
Figure 5:
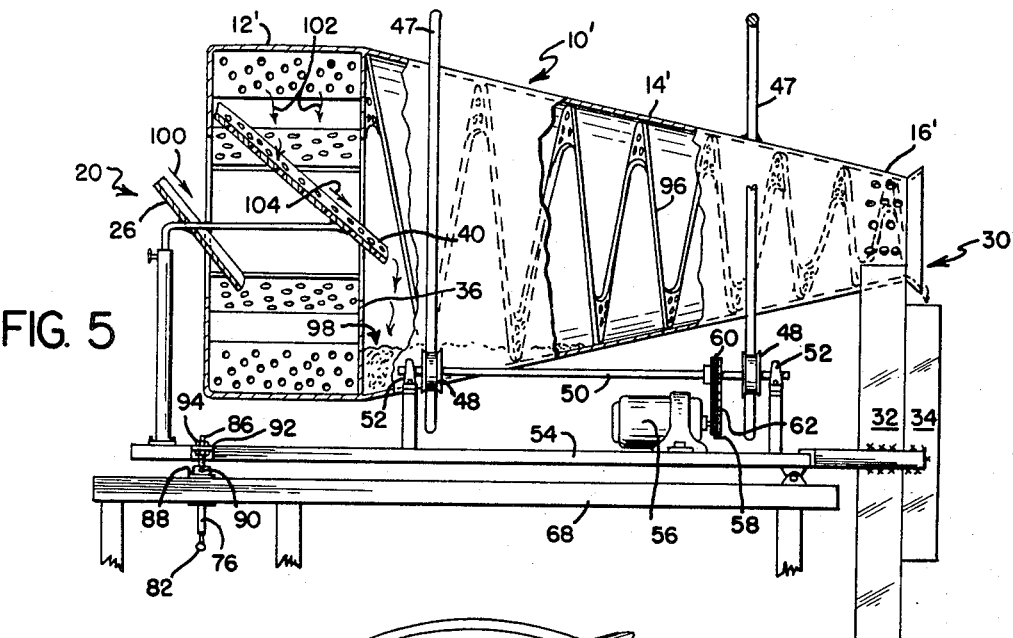
Figure 3:
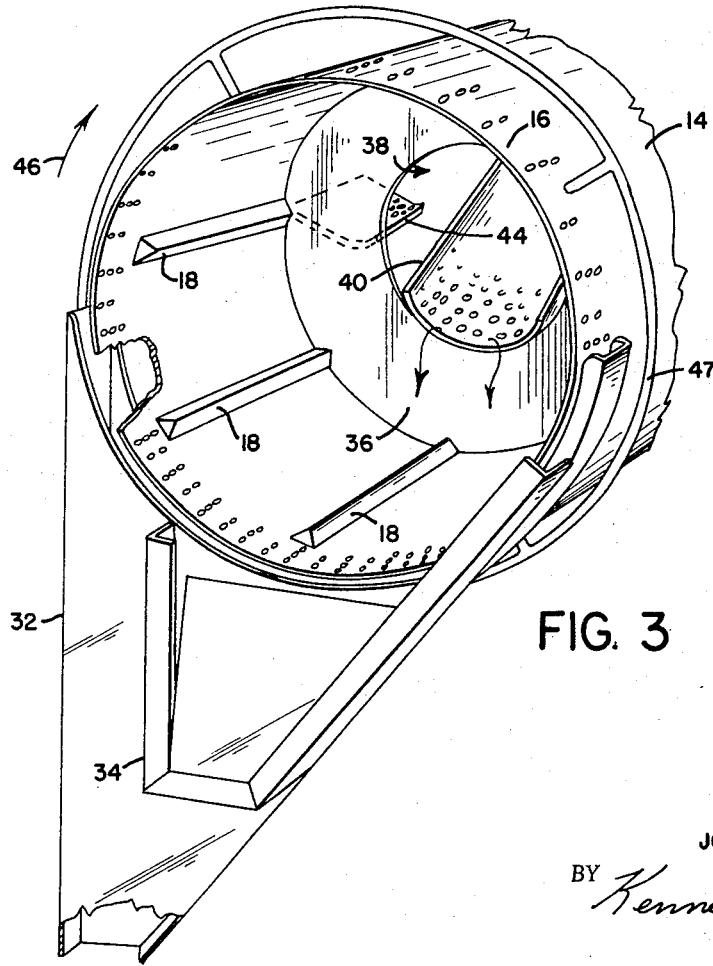

FIG. 1 is a side elevational view, partially in cross section, illustrating one form of the present invention, FIG. 2 is an end view of the apparatus shown in FIG. 1 looking from the left of FIG. 1, FIG. 3 is a partial perspective view of the apparatus shown in FIG. 1 looking from the right of FIG. 1, FIG. 4 is a cross-sectional view taken along lines 4—4 of a portion of the apparatus shown in FIG. 1, and FIG. 5 is a side view, partially in cross section, showing another form of the present invention.

Referring now to FIG. 1, one embodiment of a continuous crumb coating machine of the present invention comprises a rotatable chamber or drum 10 which includes a first imperforate cylindrical section 12, a second inperforate cylindrical section 14, and a perforate cylindrical section 16.

As best viewed in FIG. 3, the imperforate section 14 is provided with a number of tumbling ribs or raised portions 18, which extend along the length of the interior of the section 14.

The left end of the machine as viewed in FIG. 1 is the inlet end 20. The inlet end 20 is partially covered by an end plate 22 which is sealed to the edges of the walls of the rotatable chamber or drum 10. From FIG. 2, it can be seen that the end plate 22 has a central opening 24. Into this opening 24 projects a first pour spout 26. The pour spout 26 is held in place by a support member 28 as will be more fully explained hereinafter.

The other end of the apparatus is the discharge or outlet end 30. A first collecting member 32 is positioned near the outlet end 30 directly below the perforate section 16.

A second collecting member 34 is positioned near the outlet end 30 so that particles, such as coated food products, leaving the outlet end 30 will fall into the second collecting member 34.

Positioned between the first imperforate section 12 and the second imperforate section 14 is a circular intermediate retaining wall 36. The wall 36 is sealed along its outer circumference to the interior surface of the walls of the drum 10. From FIG. 3, it can be seen that the wall member 36 has a central opening 38. Into this opening 38 projects a second pour spout 40. The pour spout 40 is perforate, slightly concave in shape, and is held in place by a support member 42 which is fastened to the first pour spout 26. The pour spout 40 is positioned so that the end thereof in the first imperforate section 12 is higher than the end thereof extending in the second imperforate section 14.

As best viewed in FIG. 4, the imperforate section 12 is formed with a series of perforated lifter flights 44. These lifter flights 44 extend from the inner surface of the drum 10 toward the edge of the central opening 24 of the end plate 22. The edges of the lifting flights 44 nearest the central opening 24 are slightly curved so that when the chamber or drum 10 rotates in the direction of the arrows 46, any objects entrained by the lifting flights 44 will have a tendency to be retained upon such lifting flights until the reach a position substantially above the pour spout 40 so that any objects picked up thereon will only slide off onto the pour spout 40. The concave shape of the spout 40 insures that any object placed thereon will tend to only slide off the lower end thereof into the imperforate section 14.

A pair of circumferential tracks 47 are situated along the outside of drum 10. These tracks permit the rotation of the drum 10 about its longitudinal axis. Cooperating in this achievement are four flanged wheels 48, each of which is mounted on a shaft 50 journaled in pillow block bearings 52.

The flanged wheels 48 are actually carried on a bed frame or cradle 54. The frame 54 supports a drive motor 56 for the two flanged wheels 48 nearest the viewer in FIG. 1. The motor 56 has a sprocket 58 and a similar sprocket 60 is fixedly mounted on one of the shafts 50. Entrained about these sprockets 58, 60 is a chain 62 for transmitting rotary motion from the drive motor 56 to the shaft 50 at the right in FIG. 1.

The support member 28 for the pour spout 26 is carried in place on the bed frame 54. Thus the pour spouts 26 and 40 remain stationary with respect to the rotary movement of the chamber 10 about its longitudinal generally horizontal axis.

Below the bed frame or cradle 54 is a base frame or foundation 68. The base frame or foundation 68 is provided with means for tilting the drum 10 from a truly horizontal position to one in which the outlet end 30 is lowered. The means for effecting this adjustment is derived from a pair of pivot brackets 70 located near the outlet end 30 of the drum 10, but fixed to the bed frame 54. A somewhat similar pair of pivot brackets 72 extend upwardly from the outside of the base frame 68. Through the agency of pivot pins 74 passing through these brackets 70, 72, this particular outlet end 30 of the drum 10 is made pivotal.

Moving attention now to the inlet end 20 of the drum 10, it will be seen from FIG. 2 that a vertically disposed threaded lifting shaft 76 is employed. The shaft 76 has an upper ball end 78 which is received in a socket member 80 fixedly carried on the underside of the bed frame 54. By means of a ratchet handle 82 at the lower end of the shaft 76, the shaft 76 may be rotated so as to advance or retract the shaft with relation to a pair of tapped pads or blocks 84 fixedly disposed on the frame 68. In this way, the inlet end 20 can be elevated with respect to the outlet end 30, pivoting taking place about the previously mentioned pivot pins 74.

A pair of hold-down threaded studs 86 are used in anchoring the bed frame 54 after adjustment has been made by the lifting shaft 76. These hold-down studs 86 have their lower ends pivotally attached to clevises 88 affixed to the base or foundation frame 68 through the medium of pins 90. Apertured angled brackets 92 on either side of the frame 54 encircle the studs 86. When the hold-down nuts 94 are tightened against the brackets 92, it will be appreciated that the frame 54 is made rigid with respect to the frame 68.

Referring now to FIG. 5 there is shown, in partial cross section, an alternate form of the rotatable chamber 10 shown in FIG. 1. This alternate form of the rotatable chamber 10 of FIG. 1 is designated by numeral 10'. The chamber 10' has a first imperforate cylindrical section 12', a second imperforate section 14' and a perforate section 16'. The second imperforate section 14' and the perforate section 16' are conical in shape. On the inner surface of the wall of the second imperforate section 14' is a helical member 96 which is rigidly connected to said inside wall surface. The helical member 96 is perforated with a number of holes which are normally smaller than the food product to be coated with crumbs, but normally larger than said crumbs. This is so that as the chamber 10' rotates in a clockwise direction when viewed from looking directly at the right end of the chamber 10' shown in FIG. 5, said food product will be advanced to the outlet 30' while said holes permit said crumbs to flow away from said outlet 30' into a reservoir 98.

As can be seen from the drawing, many features of the alternate form of the invention shown in FIG. 5 are identical to the number designated features of the apparatus shown and described in connection with FIGS. 1–4. Accordingly, it does not appear necessary to go into this same detail again.

As shown in FIGS. 1 and 5, the first pour spout 26 is intended to direct the food product to be crumb coated into the coating chamber 10 or 10', as the case may be. The direction that the food product takes along the first pour spout 26 has been indicated by the arrow 100. It will be appreciated that the first pour spout 26 is connected to a suitable hopper in which the food product is temporarily stored. The first pour spout 26 directs the food product into the first imperforate section 12 or 12', as the case may be, where it becomes immersed in a liquid batter which has been previously placed therein.

The food product remains within the liquid batter contained in the first imperforate section 12 or 12' for a very short period of time. This occurs since the chamber 10 or 10' is constantly rotating in the direction shown by arrow 46 of FIGS. 3 and 4. Due to this rotation, almost as soon as the food product enters the first imperforate section 12 or 12', it is engaged by one of the lifting flights 44 and lifted out of such batter. As each of the lifting flights 44 approach a position substantially above the pour spout 40 as shown in FIG. 4, the food product picked up by such flight slides off of such flight onto said second pour spout 40. The direction the food product takes from the flights 44 to the pour spout 40 is indicated by arrows 102 (FIGS. 1, 4, and 5).

The second pour spout 40 then passes the food product placed thereon by the lifting flights into the second imperforate section 14 or 14', as the case may be, of the rotating chamber. The direction that the food product takes along the second pour spout 40 has been indicated by the arrow 104 (FIGS. 1 and 5).

In the imperforate section 14 or 14', the food product is tumbled about in crumbs, such as bread crumbs, which have previously been placed in such section. The food product is tumbled about in section 14 of FIG. 1 by virtue of the rotating cylindrical wall constituting this section and the inwardly projecting tumbling ribs 18 (see FIG. 3) attached to such section. In the form of the invention shown in FIG. 5, as the drum 10' is rotated in a clockwise direction as viewed from looking directly at the right end of the chamber 10', the flights of the helical member 96 advance the food product from the reservoir 98 near the wall 36 to the outlet end 30. The helical member 96 operates to agitate and aid the coating of the food product with crumbs, such as bread crumbs, which are between the flights of the perforated helical member 96. The clockwise rotary motion of the chamber 10' lifts the food product toward the outlet 30. Since the crumbs are relatively fine as compared to the food product, the crumbs tend to fall back through the perforations of the helical member 96 toward the wall member 36 separating the two perforate sections 12' and 14'.

The rate of rotation of the chamber 10 is co-ordinated with the pitch of the helical member 96 to vary the retention time of the food product with the crumbs. Retention time is the period of time which the product remains in contact with the bread crumbs. The retention time can be varied from as few as 6 seconds or less, to as long as 20 seconds or more depending upon the coating desired.

Thus, it is seen that by tilting the chamber 10 of FIG. 1 and rotating it or by the action of the helical member 96 in the chamber 10' of FIG. 5 as it rotates, the food product is constantly advanced through the section 14 or section 14', respectively, receiving a coating of crumbs while traversing these sections, and is moved into the imperforate section 16 or 16', respectively, and then out the outlet end 30 into the collecting member 34. Substantially all of the crumbs which accompany the food product toward the outlet 30 and which are not coated on the food product, fall through the perforations in the perforate section 16 or 16' into the first collecting member 32. These crumbs can then be fed back into the imperforate sections 14 or 14' for reuse.

Up to this point very little has been said concerning the type of food product that can be coated with crumbs with the herein disclosed apparatus. This is so inasmuch as various food products can be coated with crumbs with an apparatus of the envisioned type. It should be stressed, however, that the apparatus is particularly suited for handling ring-shaped products and at the same time assuring that such ring-shaped products will be coated uniformly so that the necessary uniform heating of such product to place it in its final edible form can be readily and properly accomplished.

It might be mentioned that the batter liquid used in imperforate sections 12 or 12' is capable of rather wide variations as to the ingredients constituting same. One liquid batter that has been utilized is a slurry comprised of 84% milk, 12% salt, 2% egg powder, and 2% flour-by weight. This particular liquid batter was used for wetting a flavored ring snack made from a dry mix comprised of 93% rice flour, 5% corn flour, 2% salt by weight which was then mixed with water in the proportion of 0.43 pound of dry mix per minute with 0.20 pound of water. The dough resulting from this dry mix-water combination was extruded in the form of rings which were approximately one inch in diameter, one-quarter inch wide, and with a wall thickness of approximately 0.050 of an inch. These rings were then fed down the spout 26 into the liquid batter being retained in the first imperforate section. After being momentarily immersed in this batter, the rings were passed to the crumb retaining or second imperforate section where they were tumbled about with bread crumbs. Subsequently these breaded rings were discharged through the outlet 30.

In view of the principles set forth herein, I have shown some of the ways of carrying out the present invention and some of the equivalents which are suggested for these disclosures.

Now, therefore, I claim:

1. A continuous crumb coating machine for coating food products comprising a coating chamber rotatable about a generally horizontal axis and having an inlet and an outlet, said chamber having a first imperforate section near said inlet, said chamber having a second imperforate section near said outlet, an intermediate wall member having an opening, said intermediate wall separating said first and second imperforate sections, an end plate having an opening, said end plate being secured across said inlet and forming a retaining wall along one side of said first imperforate section, a series of circumferentially spaced lifting flights extending between said end plate and said intermediate wall member and extending from the wall of the chamber inwardly toward said openings, tumbling means positioned along the inside surface of the wall of said second imperforate section and extending inwardly from said inside surface, a first means for feeding the food product to be crumb coated through said end plate opening into said first imperforate section, a second means for feeding the food product to be crumb coated through said intermediate wall opening into said second imperforate section for subsequent passage through said second imperforate section and thence discharge at the outlet, and means for rotating said chamber to move said product by means of said lifting flights from said first imperforate section to said second feeding means and to tumble said products in said second imperforate section as it passes longitudinally through said second imperforate section toward said outlet.

2. A continuous crumb coating machine as called for in claim 1 wherein said coating chamber is a cylindrical drum.

3. A continuous crumb coating machine as called for in claim 1 wherein said tumbling means includes a series of circumferentially spaced enlongated rib members which extend from said intermediate wall toward said outlet.

4. A continuous crumb coating machine as called for in claim 1 wherein said tumbling means includes a helical member which is rotatable with said second imperforate section for advancing said food product through said second imperforate section to said outlet.

5. A continuous crumb coating machine as called for in claim 4 wherein said helical member has perforations which permit the crumbs to flow away from said outlet as said food product is advanced to said outlet.

6. A continuous crumb coating machine as called for in claim 4 wherein said second imperforate section is a truncated cone.

7. A continuous crumb coating machine as called for in claim 1 wherein said coating chamber includes a perforate section along the outlet edge of said second imperforate section.

8. A continuous crumb coating machine as called for in claim 1 wherein said lifting flights are perforated.

9. A continuous crumb coating machine as called for in claim 1 wherein said second feeding means has raised edges along its length and is perforated.

10. A continuous crumb coating machine as called for in claim 1 wherein said coating chamber includes a perforate section along the outlet edge of said second imperforate section, said intermediate wall member and said end plate being circular and having said openings therein being centrally positioned therein, said series of lifting flights being perforated and having their edges nearest said central openings being slightly turned in the direction of intended rotation of said chamber, and said second feeding means is perforated and has raised edges along its length.

References Cited

UNITED STATES PATENTS

| | | | |
|---|---|---|---|
| 1,012,877 | 12/1911 | Mahan | 118—19 |
| 2,970,563 | 2/1961 | Hunter | 118—19 |

CHARLES A. WILLMUTH, *Primary Examiner.*

J. P. McINTOSH, *Assistant Examiner.*